(12) United States Patent
Iwaki

(10) Patent No.: US 7,363,884 B2
(45) Date of Patent: Apr. 29, 2008

(54) ENGINE CONTROL DEVICE WITH REVERSE CONTROL FUNCTION

(75) Inventor: Tomohiro Iwaki, Ohka (JP)

(73) Assignee: Kokusan Denki Co., Ltd., Shizuoka-ken (JP)

( * ) Notice: Subject to any disclaimer, the term of this patent is extended or adjusted under 35 U.S.C. 154(b) by 64 days.

(21) Appl. No.: 11/502,230

(22) Filed: Aug. 10, 2006

(65) Prior Publication Data

US 2008/0035109 A1   Feb. 14, 2008

(51) Int. Cl.
*F01L 13/02* (2006.01)
(52) U.S. Cl. .................................. 123/41 R; 123/41 E
(58) Field of Classification Search .............. 123/41 E, 123/41 R, 65 R, 198 D
See application file for complete search history.

(56) References Cited

U.S. PATENT DOCUMENTS

| | | | |
|---|---|---|---|
| 5,036,802 A | | 8/1991 | D'Amours |
| 5,794,574 A | * | 8/1998 | Bostelmann et al. ..... 123/41 E |
| 6,044,807 A | * | 4/2000 | Hata ......................... 123/41 E |
| 6,098,574 A | * | 8/2000 | Arakawa et al. ........... 123/41 E |
| 6,474,273 B1 | | 11/2002 | Kinoshita et al. |
| 6,647,933 B2 | * | 11/2003 | Tsukada et al. ........... 123/41 E |
| 6,830,015 B2 | * | 12/2004 | Venturoli et al. ......... 123/41 E |

* cited by examiner

*Primary Examiner*—Stephen K. Cronin
*Assistant Examiner*—Hyder Ali
(74) *Attorney, Agent, or Firm*—Pearne & Gordon LLP

(57) ABSTRACT

An engine control device with a reverse control function including: reverse control means for performing reverse control including a process of excessively advancing an ignition position of an engine for reversing a rotational direction of the engine when a reverse switch is operated; and a light emitting display device that displays that the reverse control is performed, wherein the reverse control means further includes light emitting display device blinking means for blinking the light emitting display device when the reverse switch is once operated, and operating error preventing means for starting the reverse control when the reverse switch is again operated within a set time after the one operation of the reverse switch, and stopping the reverse control when the reverse switch is not again operated within the set time after the one operation of the reverse switch.

3 Claims, 3 Drawing Sheets

ENGINE CONTROL DEVICE WITH REVERSE CONTROL FUNCTION

TECHNICAL FIELD OF THE INVENTION

The present invention relates to an engine control device with a reverse control function of reversing a rotational direction of an engine according to a driver's switch operation.

BACKGROUND OF THE INVENTION

A compact two cycle engine is often used as a drive source in vehicles such as motor scooters, snow mobiles, or buggies. For simplicity of operation, a centrifugal clutch type continuously variable transmission is often used as a power transmission device that transmits an output of an engine to drive wheels in such vehicles. Such vehicles place importance on components being compact, lightweight, inexpensive, and easily operable, and thus a continuously variable transmission including no back gear is often used.

The vehicle using the transmission including no back gear cannot move backward, and if a running direction of the vehicle needs to be reversed in a narrow place, the entire vehicle body needs to be lifted to change the orientation thereof, resulting in poor operability.

Thus, as described in U.S. Pat. No. 5,036,802, an engine ignition control device having a reverse control function of switching a rotational direction of an engine as required is proposed, noting a feature of a two cycle engine that can be rotated in both forward and reverse directions.

In the ignition control device described in U.S. Pat. No. 5,036,802, when a command for reversing the rotational direction of the two cycle engine is issued, the engine is first brought into a misfire state to reduce a rotational speed of the engine. Then, when the rotational speed of the engine is sufficiently reduced to reduce the inertia of a piston, an ignition position of the engine (a rotational angle position of a rotating shaft of the engine when ignited) is advanced to an excessively advanced position (a further advanced position from a proper maximum advanced position of the ignition position in normal operation). When the engine is ignited in the excessively advanced position with such reduced inertia of the engine, the piston moving toward the top dead center is pushed back to reverse the rotational direction of the engine. After confirmed that the rotational direction of the engine is reversed, the engine is ignited in a proper ignition position in the rotational direction to allow the engine to be operated in a state of the rotational direction being reversed.

In such a conventional engine control device, as disclosed in U.S. Pat. No. 6,474,273, when a rotational direction of an engine is reversed to a vehicle retracting direction, a light emitting display device such as a display lamp or an LED is lighted to indicate to a driver that a running direction of a vehicle is a retracting direction.

In a conventional engine control device that performs reverse control, when an advancing vehicle is stopped and then a driver once operates a reverse switch, reverse control is performed for reversing a rotational direction of an engine to a vehicle retracting direction, and when the retracting vehicle is stopped and then the driver once operates the reverse switch, reverse control is performed for reversing the rotational direction of the engine to a vehicle advancing direction. Thus, when the driver accidentally operates the reverse switch, the reverse control may be immediately performed to reverse the rotational direction of the engine, causing the vehicle to run in an unexpected direction for the driver.

In the conventional engine control device, when the rotational direction of the engine is reversed to the vehicle retracting direction, the light emitting display device is lighted to indicate to the driver that the running direction of the vehicle is the retracting direction, but if the light emitting display device and/or a drive circuit for driving the light emitting display device is broken, the light emitting display device is not lighted even if the rotational direction of the engine is reversed. Thus, the running direction of the vehicle cannot be indicated to the driver, and the vehicle may run in an unexpected direction for the driver.

SUMMARY OF THE INVENTION

An object of the present invention is to provide an engine control device that eliminates the risk that an accidental operation of a reverse switch by a driver causes reverse control to be performed to reverse a rotational direction of an engine.

Another object of the present invention is to provide an engine control device that can indicate to a driver whether a light emitting display device is broken before reverse control of an engine.

The present invention relates to an engine control device that controls a two cycle engine for driving a vehicle by using a microcomputer, including: a reverse switch operated for reversing a rotational direction of the engine; reverse control means for performing reverse control including a process of excessively advancing an ignition position of the engine for reversing the rotational direction of the engine when the reverse switch is operated; and a light emitting display device which displays that the reverse control is performed.

The reverse control means includes light emitting display device blinking means for blinking the light emitting display device when the reverse switch is once operated, and operating error preventing means for starting the reverse control when the reverse switch is again operated within a set time after the one operation of the reverse switch, and stopping the reverse control when the reverse switch is not again operated within the set time after the one operation of the reverse switch.

Comprised as described above, the one operation only of the reverse switch does not start the reverse control, thereby preventing an accidental operation from causing the reverse control to be performed and preventing a vehicle from running in an unexpected direction for a driver.

Comprised as described above, if the light emitting display device is normal, the light emitting display device blinks without fail before the start of the reverse control when the reverse switch is operated, and thus it can be confirmed whether the light emitting display device and a drive circuit thereof are normal in each operation of the reverse switch.

In a preferred aspect of the present invention, the reverse control means further includes light emitting display device control means for continuously lighting the light emitting display device when the rotational direction of the engine reversed by the reverse control is a vehicle retracting direction, and extinguishing the light emitting display device when the rotational direction of the engine reversed by the reverse control is a vehicle advancing direction.

With the light emitting display device control means as described above, continuous lighting of the light emitting display device can indicate to the driver that the engine rotates in the vehicle retracting direction, and extinguishing of the light emitting display device can indicate to the driver that the engine rotates in the vehicle advancing direction.

Another preferred aspect of the present invention includes: a reverse switch operated for reversing a rotational direction of the engine; reverse control means for performing reverse control for reversing the rotational direction of the engine, including speed reduction control means for reducing a rotational speed of the engine when the reverse switch is operated, excessive advance control means for excessively advancing an ignition position of the engine when the rotational speed is reduced to an excessive advance start rotational speed, rotational direction determination means for determining the rotational direction of the engine for confirming whether an excessive advance of the ignition position causes the rotational direction of the engine to be reversed, and reverse time initial ignition control means for igniting the engine in the ignition position at a low speed in a state of the rotational direction being reversed when it is confirmed that the rotational direction is reversed; and a light emitting display device which displays that the reverse control is performed.

In this case, the reverse control means includes light emitting display device blinking means for blinking the light emitting display device when the reverse switch is once operated, operating error preventing means for starting the reverse control when the reverse switch is again operated within a set time after the one operation of the reverse switch, and stopping the reverse control when the reverse switch is not again operated within the set time after the one operation of the reverse switch, and light emitting display device control means for continuously lighting the light emitting display device when the rotational direction determination means determines that the rotational direction of the engine is a vehicle retracting direction, and extinguishing the light emitting display device when the rotational direction determination means determines that the rotational direction of the engine is a vehicle advancing direction.

As described above, according to the present invention, the reverse control means includes the light emitting display device blinking means for blinking the light emitting display device when the reverse switch is once operated, and the operating error preventing means for starting the reverse control when the reverse switch is again operated within the set time after the one operation of the reverse switch, and stopping the reverse control when the reverse switch is not again operated within the set time after the one operation of the reverse switch, and the one operation only of the reverse switch does not start the reverse control, thereby preventing an accidental operation of the reverse switch from causing the reverse control to be performed and preventing the vehicle from running in an unexpected direction for a driver.

According to the present invention, if the light emitting display device and a drive circuit thereof are normal, the light emitting display device blinks without fail before the start of the reverse control when the reverse switch is operated, and thus it can be confirmed whether the light emitting display device and the drive circuit thereof are normal in each operation of the reverse switch.

BRIEF DESCRIPTION OF THE DRAWINGS

The above and other objects and features of the present invention will be apparent from the detailed description of the preferred embodiment of the invention, which is described and illustrated with reference to the accompanying drawings, in which.

DETAILED DESCRIPTION OF THE PREFERRED EMBODIMENTS

Now, a preferred embodiment of an engine control device according to the present invention will be described in detail with reference to the drawings.

Figure 1:
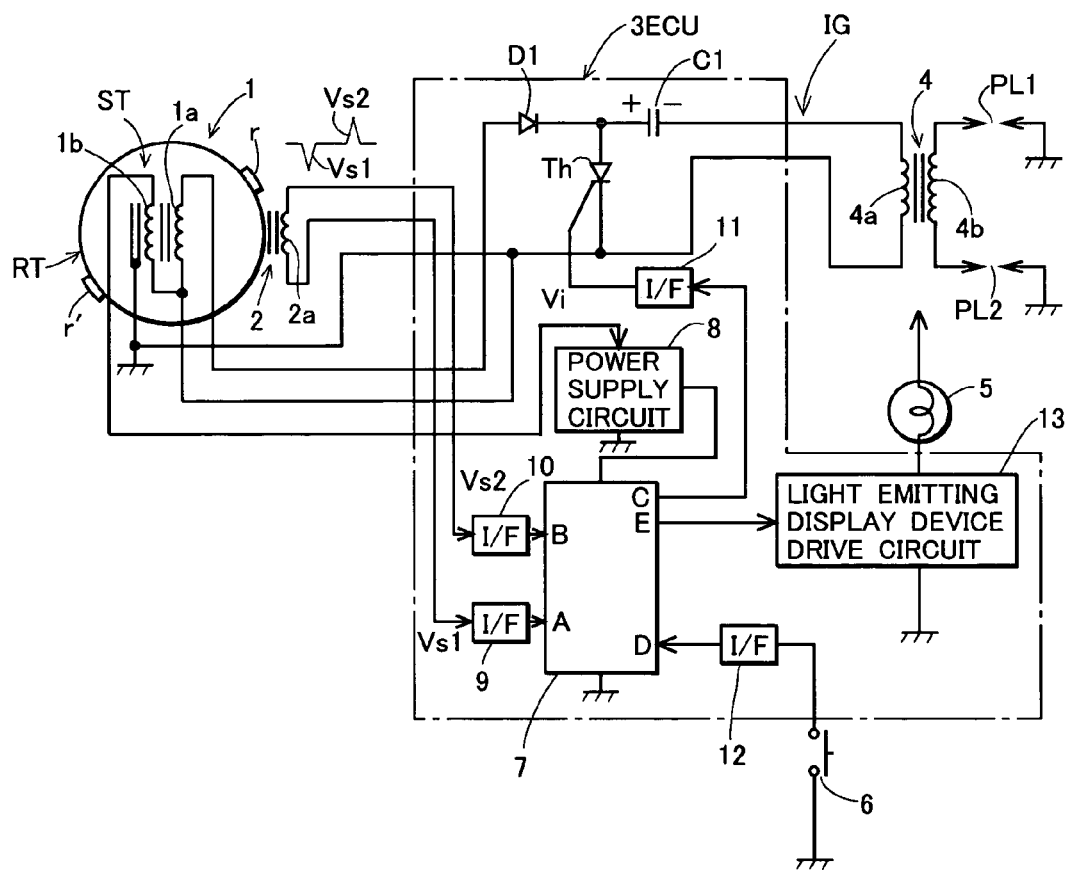
FIG. 1 is a schematic circuit diagram showing an exemplary construction of hardware according to an embodiment of the present invention.

FIG. 1 shows a construction of hardware of the engine control device according to the present invention, and in this example, an engine to be controlled is a two cylinder two cycle engine. In FIG. 1, a reference numeral 1 denotes a flywheel magneto generator driven by an engine not shown; 2, a pulse signal generator that outputs a pulse signal with different polarities when a rotational angle position of a crankshaft of the engine matches a specific position; 3, an electronic control unit (ECU); 4, an ignition coil connected to the ECU 3; 5, a light emitting display device such as a lamp or an LED that displays a rotational direction of the engine; and 6, a reverse switch operated by a driver for reversing the rotational direction of the engine.

The flywheel magneto generator 1 is comprised of a rotor RT and a stator ST. The rotor RT is a known one including a cup-like flywheel, and a permanent magnet mounted to an inner periphery of a peripheral wall portion of the flywheel, and a boss provided in the center of a bottom wall portion of the flywheel is connected to the crankshaft of the engine. The stator ST includes an armature core having a magnetic pole portion facing a magnetic pole of the rotor RT, and magneto coils 1a and 1b wound around the armature core, and the armature core is secured to a case or the like of the engine.

The magneto coil 1a is wound with a sufficiently large number of windings, and used as an exciter coil that constitutes a power supply of an ignition device. The magneto coil 1b is used as a power supply for supplying power to a microprocessor or the like in the ECU 3.

The pulse signal generator 2 is comprised of a signal armature including reluctors r and r' constituted by arcuate protrusions or recesses formed at 180° intervals in an outer periphery of the flywheel of the magneto generator 1 corresponding to the two cylinders of the engine, an iron core having magnetic pole portions facing the reluctors, a signal coil 2a wound around the iron core, and a permanent magnet magnetically connected to the iron core. When a magnetic pole of the signal armature detects a leading edge and a trailing edge in a rotational direction of each of the reluctors r and r', the pulse signal generator 2 generates a first pulse signal Vs1 and a second pulse signal Vs2 for the cylinders corresponding to the respective reluctors. In the embodiment, the pulse signal generator 2 generates a first negative pulse signal Vs1 for each cylinder in a reference crank angle position set in a position sufficiently advanced from a crank angle position (a top dead center position) where a piston in each cylinder of the engine reaches the top dead center in a compression stroke, and generates a second positive pulse signal Vs2 for each cylinder in a position delayed from the reference crank angle position and slightly advanced from the top dead center position.

In the shown example, one ends of the magneto coils 1a and 1b are commonly connected, and a common connecting point of the magneto coils is connected to an earth line connected to an earth potential portion having the same potential as the armature core of the stator ST in the ECU3.

The other end of the magneto coil 1a used as the exciter coil is connected to one end of an ignition capacitor C1 through a diode D1 having an anode directed to the other end of the magneto coil 1a in the ECU 3, and the other end of the capacitor C1 is connected to one end of a primary coil 4a of the ignition coil 4. An anode of a thyristor Th as a discharge switch is connected to one end of the capacitor C1, a cathode of the thyristor Th is connected to the earth line and to the other end of the primary coil 4a of the ignition coil. In this example, the ignition coil 4 is a so-called simultaneous ignition coil that simultaneously emits sparks to two ignition plugs, and one end and the other end of a secondary coil 4b of the ignition coil 4 are connected to terminals opposite to the ground of ignition plugs PL1 and PL2 mounted to first and second cylinders, respectively, of the engine.

In the shown example, an ignition circuit that causes a sudden change in a primary current of the ignition coil at the ignition of the engine is comprised of the diode D1, the ignition capacitor C1, and the thyristor Th, and a known capacitor discharge engine ignition device IG is comprised of the ignition circuit and the ignition coil 4.

In the ignition device in FIG. 1, when the magneto coil 1a induces an AC voltage in synchronization with a rotation of the crankshaft of the engine, a current flows through a circuit of the magneto coil 1a—the diode D1—the ignition capacitor C1—the primary coil 4a of the ignition coil—the magneto coil 1a in a positive half wave, and the ignition capacitor C1 is charged to have the shown polarity. When an ignition signal Vi is provided to a gate of the thyristor Th in the ignition position of the engine (a crank angle position at the time of an ignition operation), the thyristor Th conducts, and charges of the ignition capacitor C1 are discharged through the thyristor Th and the primary coil 4a of the ignition coil. This induces a high voltage in the primary coil 4a of the ignition coil, and the voltage is increased by the ratio of voltage increase between the primary and secondary ignition coils to induce a high voltage for ignition in the secondary coil 4b. The high voltage for ignition is applied to the ignition plugs PL1 and PL2, and thus sparks are simultaneously emitted to the ignition plugs of the first and second cylinders of the engine.

In the two cylinder two cycle engine, when one of the two cylinders is at ignition timing (an end of the compression stroke), the other cylinder is at an end of an exhaust stroke. Thus, simultaneous ignition in the two cylinders causes no trouble.

The construction of the shown capacitor discharge ignition device is shown by way of example, and the present invention is not limited to the case using the ignition device having the shown construction. For example, in the shown example, the ignition capacitor C1 is charged with an output of one half wave of the magneto coil (exciter coil) 1a, but a magneto coil 1a with a relatively small number of windings may be used to charge the ignition capacitor C1 with a voltage obtained by increasing the output of the magneto coil 1a with a chopper. To increase a discharge time of the capacitor C1, the diode may be connected in parallel with the primary coil 4a, or the position of the capacitor C1 and the position of the thyristor Th may be interchanged. Capacity discharge ignition devices having various constructions are known, and any type of capacity discharge ignition device may be used in the present invention. The present invention may be applied to an engine using a current interrupting ignition device besides the engine using the capacitor discharge ignition device.

The ECU 3 includes a microprocessor (MPU) 7. To supply a power supply voltage to the microprocessor, an output of the magneto coil 1b is input to a power supply circuit 8. The power supply circuit 8 converts an AC voltage output by the magneto coil 1b into a certain voltage (for example, 5 volt) suitable for driving the microprocessor, and supplies the voltage to a power supply terminal of the microprocessor.

A power supply circuit that converts a voltage of a negative half wave that is not used for charging the ignition capacitor C1 among outputs of positive and negative half waves of the magneto coil 1a into a certain DC voltage may be provided to supply a power supply voltage to the microprocessor with an output of the power supply circuit. In this case, the output of the magneto coil 1b is used for driving other load. For example, the output of the magneto coil 1b is provided to the power supply circuit that outputs a higher DC voltage than the voltage for driving the microprocessor.

The first pulse signal Vs1 and the second pulse signal Vs2 for the cylinders generated by the pulse signal generator 2 are input to ports A and B, respectively, of the microprocessor 7 through interfaces (I/F) 9 and 10. The microprocessor 7 arithmetically operates the ignition position based on rotation information of the engine obtained from the first pulse signal Vs1 and the second pulse signal Vs2, and provides an ignition signal Vi from a port C through an interface 11 to the gate of the thyristor Th when the arithmetically operated ignition position is detected.

For example, the microprocessor arithmetically operates the rotational speed of the engine from a generation cycle of the pulse signal Vs1 (a time required for a half rotation of the crankshaft of the engine), and arithmetically operates the ignition position of the engine with respect to the arithmetically operated rotational speed. When the first pulse signal is generated at the reference crank angle position, the microprocessor arithmetically operates a time required for the crankshaft rotating from the reference crank angle position to the arithmetically operated ignition position at the rotational speed at the time, and the arithmetically operated time is set to an ignition timer as ignition position detecting clocking data to start measurement. When the ignition timer completes the measurement of the set clocking data, the microprocessor provides the ignition signal Vi through the interface 11 to the gate of the thyristor Th for performing the ignition operation.

The reverse switch 6 is comprised of a push button switch that is on while being pushed by the driver. The reverse switch 6 is connected to a port D of the microprocessor 7 through the interface 12, and information whether the reverse switch 6 is on is provided to the microprocessor 7 through the interface 12.

The microprocessor 7 executes a predetermined program stored in a ROM to configure normal time ignition control means for controlling an ignition position in normal operation of the engine, and reverse control means for performing control to reverse the rotational speed of the engine when a reverse command is issued by the reverse switch 6.

The reverse control means is comprised of, for example, speed reduction control means for reducing the rotational speed of the engine when the reverse switch 6 is operated, excessive advance control means for excessively advancing the ignition position of the engine to a crank angle position significantly advanced from an ignition position in the normal operation when the speed reduction control means reduces the rotational speed of the engine to less than a set value, rotational direction determination means for determining the rotational direction of the engine for confirming whether the excessive advance of the ignition position causes the rotational direction of the engine to be reversed, and reverse time initial ignition control means for igniting the engine in the ignition position at a low speed in a state of the rotational direction being reversed when it is confirmed that the rotational direction is reversed.

The technique that the excessive advance of the ignition position of the engine causes the rotational direction of the engine to be reversed is well known as described in U.S. Pat. No. 5,036,802 and U.S. Pat. No. 6,474,273, and thus detailed descriptions thereof will be omitted.

The ECU 3 is also provided with a light emitting display device drive circuit 13 for driving the light emitting display device 5. The drive circuit includes a switch element connected in series with the light emitting display device 5, turns on the switch element when a drive command VL is issued from a port E of the microprocessor 7, and passes a drive current from the power supply to the light emitting display device 5. The power supply for supplying a power supply voltage to the light emitting display device 5 may be the power supply circuit 8, or other power supply circuit that generates a higher voltage than the power supply circuit 8.

In FIG. 1, the light emitting display device drive circuit 13 is provided in the ECU 3, but the light emitting display device drive circuit may be provided outside the ECU. Similarly, the circuits such as the capacitor C1 and the thyristor Th provided on the primary side of the ignition coil may be provided outside the ECU.

Though not shown in FIG. 1, when a fuel injection device is used as means for supplying fuel to the engine, a component for configuring a fuel injection control device that controls a fuel injection valve (an injector) is further provided.

Figure 2:
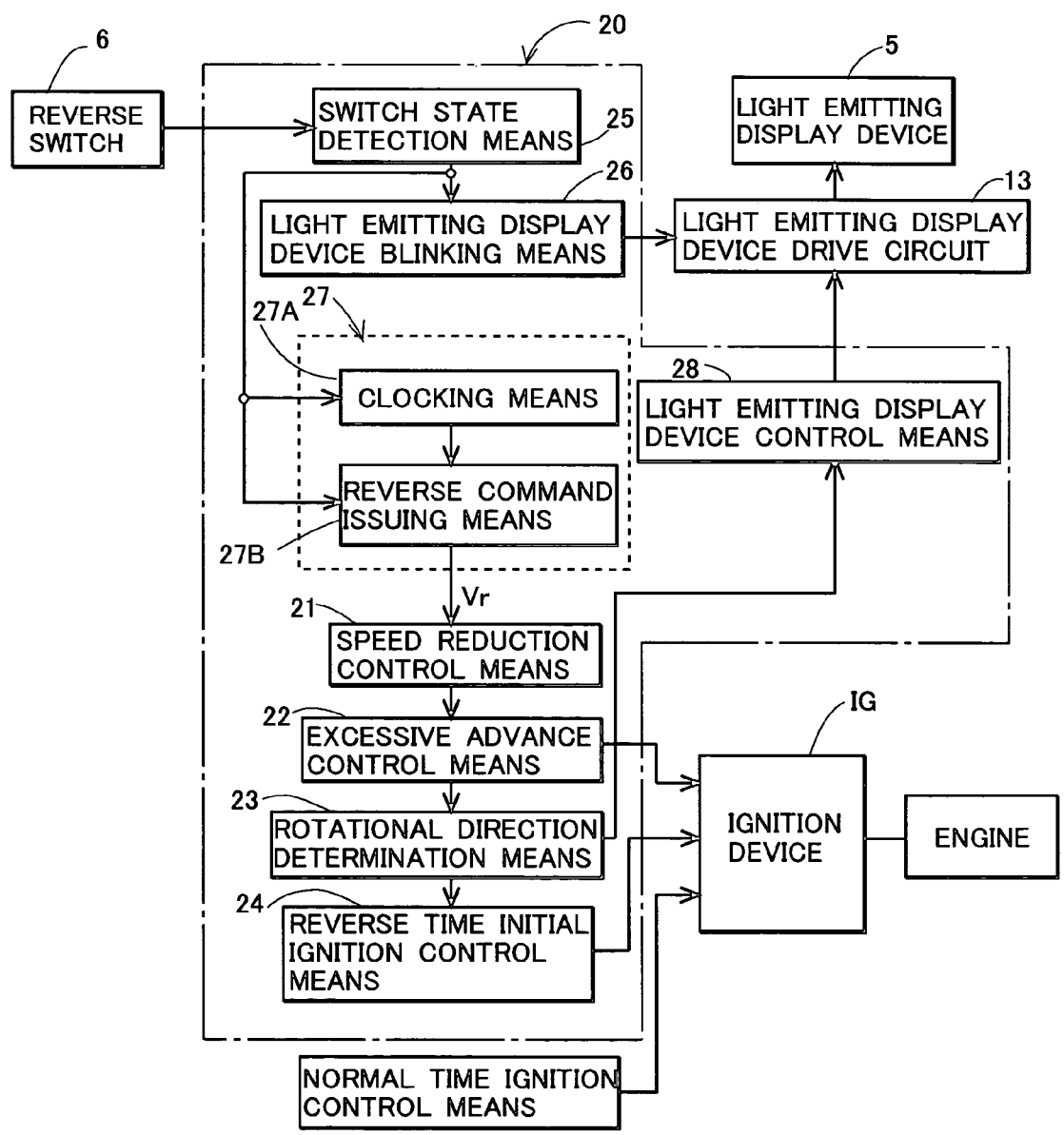
FIG. 2 is a block diagram showing a construction of a control device according to the embodiment of the present invention.

FIG. 2 shows a construction of essential portions of the engine control device including various means configured by the microprocessor 7 for performing reverse control. In FIG. 2, 5 denotes the light emitting display device; 6, the reverse switch; 13, the light emitting display device drive circuit; and IG, the ignition device, which are the same as in FIG. 1.

A reference numeral 20 denotes reverse control means, and the reverse control means includes speed reduction control means 21 for reducing the rotational speed of the engine when the reverse switch 6 is operated and a reverse command Vr is issued, excessive advance control means 22 for excessively advancing the ignition position of the engine when the speed reduction control means 21 reduces the rotational speed of the engine to an excessive advance start rotational speed, rotational direction determination means 23 for determining the rotational direction of the engine for confirming whether the excessive advance of the ignition position performed by the excessive advance control means causes the rotational direction of the engine to be reversed, and reverse time initial ignition control means 24 for igniting the engine in the ignition position at a low speed in a state of the rotational direction being reversed when the rotational direction determination means 23 confirms that the rotational direction is reversed.

The speed reduction control means 21 reduces the rotational speed of the engine sufficiently (for example, 500 [rpm]) when the reverse command is issued. Methods of reducing the rotational speed of the engine include a method of reducing fuel supplied to the engine, a method of delaying the ignition position, a method of causing misfire of the engine, or the like.

The excessive advance control means 22 advances the ignition position of the engine to an excessively advanced crank angle position advanced from the top dead center by an angle (for example, 45°) when the rotational speed is reduced to the excessive advance start rotational speed.

The reverse control means 20 according to the present invention further includes switch state detection means 25 for detecting the state of the reverse switch 6, light emitting display device blinking means 26 for controlling on/off the switch element of the light emitting display device drive circuit 13 so as to blink the light emitting display device 5 when the reverse switch 6 is once operated (turned on), operating error preventing means 27 for starting the reverse control when the reverse switch 6 is again operated (turned on) within a set time Ts after the one operation of the reverse switch 6, and stopping the reverse control when the reverse switch 6 is not operated within the set time after the one operation of the reverse switch 6, light emitting display device control means 28 for continuously lighting the light emitting display device 5 when the rotational direction determination means 23 determines that the rotational direction of the engine is a vehicle retracting direction, and extinguishing the light emitting display device 5 when the rotational direction determination means 23 determines that the rotational direction of the engine is a vehicle advancing direction. The setting time Ts is set to, for example, 5 [sec].

The shown operating error preventing means 27 is comprised of clocking means 27A for starting measurement of time when the reverse switch is once pushed, and reverse command issuing means 27B for issuing a reverse command Vr when the switch state detection means 25 detects again that the reverse switch 6 is operated (turned on) until the time measured by the clocking means 27A reaches the set time Ts, and issuing the reverse command to the speed reduction control means 21.

In FIG. 2, normal time ignition control means 30 is means for controlling the ignition position in normal operation of the engine, and is the same as means provided in a general engine that controls an ignition position with a microprocessor.

Figure 3:
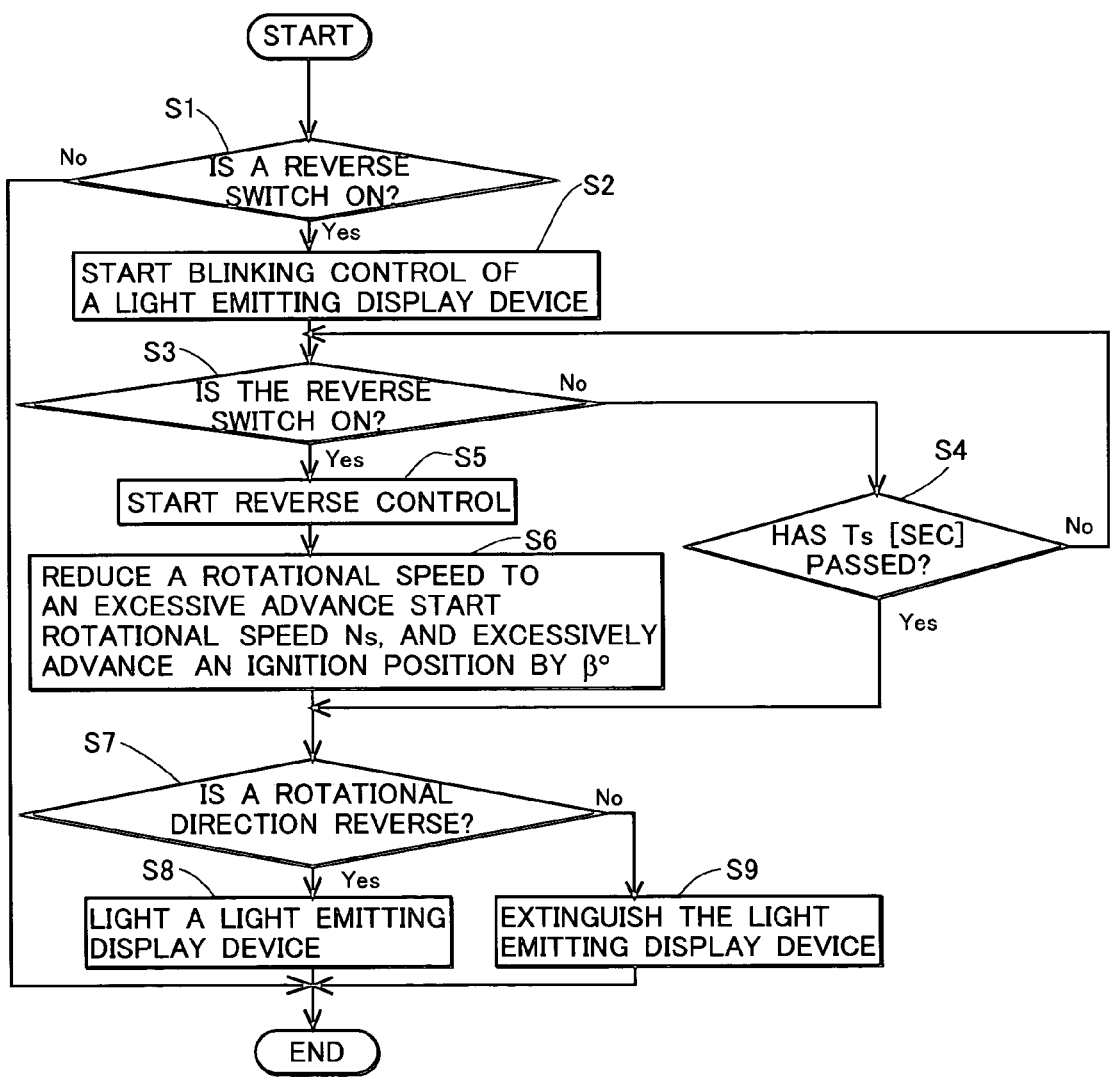
FIG. 3 is a flowchart showing an example of an algorithm of a processing executed by a microprocessor for constituting the control device in FIG. 2.

FIG. 3 shows an example of an algorithm of a processing executed by the microprocessor 7 for configuring the reverse control device in FIG. 2. The processing shown in FIG. 3 is repeatedly performed at short time intervals. When the processing shown in FIG. 3 is started, it is determined in Step S1 whether the reverse switch 6 is on. The switch state detection means 25 is configured by this process.

When it is determined in Step S1 that the reverse switch is not on, no processing is performed thereafter, and this processing is finished. When it is determined in Step 1 that the reverse switch is on, the process proceeds to Step S2 to start blinking the light emitting display device 5.

Then, in Step S3, it is determined whether the reverse switch is on. When it is determined that the reverse switch is not on, the process moves to Step S4, and it is determined whether a set time Ts [sec] has passed after one operation of the reverse switch. When it is determined that the set time Ts has not passed, the process returns to Step S3, and tuning on of the reverse switch is waited.

In Step S4, when it is determined in Step 3 that the reverse switch is turned on within the set time Ts after the one operation of the reverse switch 6, the reverse command is issued in Step S5 to start the reverse control, and in Step S6, the rotational speed of the engine is reduced to an excessive advance start rotational speed Ns, and the ignition position of the engine is excessively advanced to a crank angle position advanced from the top dead center by an angle $\beta$ (for example, 45°) when the rotational speed is reduced to the excessive advance start rotational speed Ns.

In Step S6, the ignition position of the engine is excessively advanced, then, the process moves to Step S7, and it is determined whether the rotational direction of the engine is a vehicle retracting direction. When it is determined that the engine rotates in the vehicle retracting direction, Step S8 is performed to turn on the switch element of the light emitting display device drive circuit 13 so as to continuously light the light emitting display device 5, and this processing is finished.

When it is determined in Step S7 that the engine rotates in the vehicle advancing direction, in Step S9, the switch element of the light emitting display device drive circuit is turned off to extinguish the light emitting display device 5, and this processing is finished.

When it is determined in Step S4 that the set time Ts has passed after the one operation of the reverse switch 6 (when the reverse switch is not turned on within the set time Ts), the process moves to Step S7, and the rotational direction of the engine is determined to light or extinguish the light emitting display device according to the rotational direction of the engine.

According to the algorithm in FIG. 3, the switch state detection means 25 is configured by Steps S1 and S3. The light emitting display device blinking means 26 is configured by Step 2. Further, the clocking means 27A is configured by Steps S3 and S4, and the reverse command issuing means 27B is configured by Step S5. The speed reduction control means 21 and the excessive advance control means 22 are configured by Step S6, and the rotational direction determination means 23 is configured by Step S7. Further, the light emitting display device control means 28 is configured by Steps S8 and S9.

In the embodiment, when the driver once stops the vehicle while advancing the vehicle, and operates the reverse switch 6, the light emitting display device blinking means 26 blinks the light emitting display device 5. When the driver again operates the reverse switch within the set time Ts after the one operation of the reverse switch 6, the reverse command issuing means 27B issues the reverse command, thus the speed reduction control means 21 reduces the rotational speed of the engine, and when the rotational speed of the engine is reduced to the excessive advance start rotational speed, the excessive advance control means 22 excessively advances the ignition position of the engine to reverse the rotational direction of the engine. Then, the rotational direction determination means 23 determines the rotational direction of the engine, and when the rotational direction determination means 23 determines that the engine rotates in the vehicle retracting direction, the light emitting display device 5 is lighted.

When the driver does not again operate the reverse switch 6 within the set time Ts after the operation of the reverse switch 6, the reverse control is not performed, and the light emitting display device 5 is extinguished.

When the driver once stops the vehicle while retracting the vehicle, and operates the reverse switch 6, the light emitting display device blinking means 26 blinks the light emitting display device 5. When the driver again operates the reverse switch 6 within the set time Ts after the one operation of the reverse switch 6, the reverse command issuing means 27B issues the reverse command, and the speed reduction control means 21 reduces the rotational speed of the engine, and when the rotational speed of the engine is reduced to the excessive advance start rotational speed, the excessive advance control means 22 excessively advances the ignition position of the engine to reverse the rotational direction of the engine. Then, the rotational direction determination means 23 determines the rotational direction of the engine, and when the rotational direction determination means 23 determines that the engine rotates in the vehicle advancing direction, the light emitting display device 5 is extinguished. Also in this case, when the driver does not again operate the reverse switch within the set time Ts after the operation of the reverse switch 6, the reverse control is not performed, and the light emitting display device 5 is kept lighted.

In the above described embodiment, the control of the two cylinder two cycle engine is taken as an example, but the present invention may be applied to an engine control device that performs reverse control of a single cylinder two cycle engine or a multi-cylinder two cycle engine.

In the above described embodiment, the reverse control is started when the reverse switch is once operated and then the reverse switch is again once operated within the set time, but the reverse control may be started when the reverse switch is intermittently operated multiple times within the set time.

Although the preferred embodiment of the invention has been described and illustrated with reference to the accompanying drawings, it will be understood by those skilled in the art that it is by way of examples, and that various changes and modifications may be made without departing from the spirit and scope of the invention, which is defined only to the appended claims.

What is claimed is:

1. An engine control device that controls a two cycle engine for driving a vehicle by using a microcomputer, comprising:
   a reverse switch operated for reversing a rotational direction of said engine;
   reverse control means for performing reverse control including a process of excessively advancing an ignition position of said engine for reversing the rotational direction of said engine when said reverse switch is operated; and
   a light emitting display device which displays that said reverse control is performed,
   wherein said reverse control means comprises light emitting display device blinking means for blinking said light emitting display device when said reverse switch is once operated, and operating error preventing means for starting said reverse control when said reverse switch is again operated within a set time after the one operation of said reverse switch, and stopping said reverse control when said reverse switch is not again operated within said set time after the one operation of said reverse switch.

2. The engine ignition control device according to claim 1, wherein said reverse control means further comprises light emitting display device control means for continuously lighting said light emitting display device when the rotational direction of said engine reversed by said reverse control is a vehicle retracting direction, and extinguishing said light emitting display device when the rotational direction of said engine reversed by said reverse control is a vehicle advancing direction.

3. An engine ignition control device that controls a two cycle engine for driving a vehicle by using a microcomputer, comprising:

a reverse switch operated for reversing a rotational direction of said engine;

reverse control means for performing reverse control for reversing the rotational direction of said engine, comprising speed reduction control means for reducing a rotational speed of said engine when said reverse switch is operated, excessive advance control means for excessively advancing an ignition position of said engine when said rotational speed is reduced to an excessive advance start rotational speed, rotational direction determination means for determining the rotational direction of said engine for confirming whether an excessive advance of said ignition position causes the rotational direction of said engine to be reversed, and reverse time initial ignition control means for igniting said engine in the ignition position at a low speed in a state of the rotational direction being reversed when it is confirmed that said rotational direction is reversed; and a light emitting display device which displays that said reverse control is performed, wherein said reverse control means comprises light emitting display device blinking means for blinking said light emitting display device when said reverse switch is once operated, operating error preventing means for starting said reverse control when said reverse switch is again operated within a set time after the one operation of said reverse switch, and stopping said reverse control when said reverse switch is not again operated within said set time after the one operation of said reverse switch, and light emitting display device control means for continuously lighting said light emitting display device when said rotational direction determination means determines that the rotational direction of said engine reversed is a vehicle retracting direction, and extinguishing said light emitting display device when said rotational direction determination means determines that the rotational direction of said engine is a vehicle advancing direction.

* * * * *